United States Patent
Matsuda et al.

(10) Patent No.: US 10,810,810 B2
(45) Date of Patent: Oct. 20, 2020

(54) TRAVELING INFORMATION STORING METHOD OF LEANABLE VEHICLE, TRAVELING INFORMATION PROCESSING PROGRAM, AND TRAVELING INFORMATION STORING DEVICE

(71) Applicant: KAWASAKI JUKOGYO KABUSHIKI KAISHA, Kobe-shi, Hyogo (JP)

(72) Inventors: Yoshimoto Matsuda, Kobe (JP); Jun Tominaga, Himeji (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 199 days.

(21) Appl. No.: 16/216,431

(22) Filed: Dec. 11, 2018

(65) Prior Publication Data

US 2019/0180525 A1   Jun. 13, 2019

(30) Foreign Application Priority Data

Dec. 11, 2017   (JP) .................................. 2017-236695

(51) Int. Cl.
| | |
|---|---|
| *G07C 5/08* | (2006.01) |
| *B60C 23/00* | (2006.01) |
| *B60C 19/00* | (2006.01) |
| *B62J 99/00* | (2020.01) |
| *G06F 16/29* | (2019.01) |

(Continued)

(52) U.S. Cl.
CPC .............. *G07C 5/085* (2013.01); *B60C 19/00* (2013.01); *B60C 23/00* (2013.01); *B62J 99/00* (2013.01); *G06F 16/29* (2019.01); *G07C 5/008* (2013.01); *B62J 45/10* (2020.02); *B62J 45/40* (2020.02); *B62J 45/4151* (2020.02)

(58) Field of Classification Search
CPC ......... G07C 5/085; G07C 5/008; G06F 16/69; B60C 19/00; B60C 23/00; B62J 99/00; B62J 45/10; B62J 45/40; B62J 45/4151
See application file for complete search history.

(56) References Cited

U.S. PATENT DOCUMENTS

| | | | |
|---|---|---|---|
| 7,006,901 B2 * | 2/2006 | Wang ..................... | B62J 45/412 701/1 |
| 2014/0277895 A1 * | 9/2014 | Shankwitz ............ | B60W 30/00 701/23 |

(Continued)

FOREIGN PATENT DOCUMENTS

| | | | |
|---|---|---|---|
| EP | 1679673 A1 | 7/2006 | |
| EP | 1862425 A1 | 12/2007 | |

(Continued)

*Primary Examiner* — Calvin Cheung
(74) *Attorney, Agent, or Firm* — Alleman Hall Creasman & Tuttle LLP

(57) ABSTRACT

A method of storing traveling information of a leanable vehicle which turns in a leaning state, includes the steps of: obtaining information of a traveling position history of the leanable vehicle; detecting lateral force information including a lateral force applied to the leanable vehicle in a radially outward direction of a turn or a value corresponding to the lateral force, while the leanable vehicle is turning; and storing the detected lateral force information in association with the obtained information of the traveling position history.

11 Claims, 4 Drawing Sheets

(51) Int. Cl.
*G07C 5/00* (2006.01)
*B62J 45/10* (2020.01)
*B62J 45/40* (2020.01)
*B62J 45/415* (2020.01)

(56) References Cited

U.S. PATENT DOCUMENTS

| | | | | |
|---|---|---|---|---|
| 2015/0364061 A1* | 12/2015 | Kurosawa | ............... | G09B 9/052 |
| | | | | 434/61 |
| 2016/0061132 A1* | 3/2016 | Hieda | ................ | B60K 31/0083 |
| | | | | 701/110 |
| 2016/0161526 A1* | 6/2016 | Miki | ........................ | B60T 8/172 |
| | | | | 701/124 |
| 2017/0101081 A1* | 4/2017 | Meier | ..................... | B60T 8/171 |
| 2017/0259829 A1* | 9/2017 | Heckmann | ...... | B60W 30/18145 |
| 2018/0154968 A1* | 6/2018 | Awano | ................ | B60W 40/112 |
| 2018/0265055 A1* | 9/2018 | Hasegawa | ............. | B60T 8/3225 |

FOREIGN PATENT DOCUMENTS

| | | | |
|---|---|---|---|
| EP | 2740640 | A1 | 6/2014 |
| JP | 4346609 | B2 | 10/2009 |
| WO | 2006034731 | A1 | 4/2006 |

* cited by examiner

TRAVELING INFORMATION STORING METHOD OF LEANABLE VEHICLE, TRAVELING INFORMATION PROCESSING PROGRAM, AND TRAVELING INFORMATION STORING DEVICE

CROSS-REFERENCE TO THE RELATED APPLICATION

This application claims priority to and the benefit of Japanese Patent Application No. 2017-236695 filed on Dec. 11, 2017, the entire disclosure of which is incorporated herein by reference.

BACKGROUND OF THE INVENTION

Field of the Invention

The present invention relates to a method, program and device for storing traveling information of a leanable vehicle which turns in a leaning state.

Description of the Related Art

Japanese Patent No. 4346609 discloses a technique for storing a bank angle of a vehicle body of a motorcycle so that the bank angle is linked with coordinate data.

However, the bank angle indicates a result of an operation performed by a rider of the motorcycle. For this reason, it is difficult to precisely analyze traveling based on only the bank angle.

SUMMARY OF THE INVENTION

In view of the above-described circumstances, an object of the present invention is to provide a method, program and device for storing traveling information which is easily used in traveling analysis.

According to an aspect of the present invention, there is provided a method of storing traveling information of a leanable vehicle which turns in a leaning state, the method comprising the steps of: obtaining information of a traveling position history of the leanable vehicle; detecting lateral force information including a lateral force applied to the leanable vehicle in a radially outward direction of a turn or a value corresponding to the lateral force, while the leanable vehicle is turning; and storing the detected lateral force information in association with the obtained information of the traveling position history.

In accordance with this method, with reference to the information stored after or during the traveling, the information of the lateral force generated during the turn can be obtained and the information which is helpful in the operation (manipulation) of the leanable vehicle can be obtained. Since the information of the lateral force applied to the leanable vehicle in the radially outward direction of the turn is referred to, the information which affects more the turn can be obtained, even in a case where yawing or the like occurs in the leanable vehicle while the leanable vehicle is turning.

According to another aspect of the present invention, there is provided a program installed in an information processing device which processes traveling information of a leanable vehicle which turns in a leaning state, the program causing the information processing device to perform the steps of: obtaining information of a traveling position history of the leanable vehicle; obtaining lateral force information including a lateral force applied to the leanable vehicle in a radially outward direction of a turn or a value corresponding to the lateral force, while the leanable vehicle is turning; storing the obtained lateral force information in association with the obtained information of the traveling position history; and sending the stored lateral force information and the stored information of the traveling position history to a server.

According to another aspect of the present invention, there is provided a program installed in an information processing device which processes traveling information of a leanable vehicle which turns in a leaning state, the program causing the information processing device to perform the steps of: obtaining information of a traveling position history of the leanable vehicle; obtaining lateral force information including a lateral force applied to the leanable vehicle in a radially outward direction of a turn or a value corresponding to the lateral force, while the leanable vehicle is turning; and causing a display unit to display the obtained lateral force information and the obtained information of the traveling position history in association with each other.

According to a further aspect of the present invention, there is provided a device for storing traveling information of a leanable vehicle which turns in a leaning state, the device comprising:
an identification information obtaining unit which obtains identification information of the leanable vehicle or a rider; a traveling position history obtaining unit which obtains information of a traveling position history of the leanable vehicle; a lateral force obtaining unit which obtains lateral force information including a lateral force applied to the leanable vehicle in a radially outward direction of a turn or a value corresponding to the lateral force, while the leanable vehicle is turning; a control unit connected to the traveling position history obtaining unit and to the lateral force obtaining unit; a storage unit which stores data processed by the control unit; and an output unit which causes a display unit to output the data stored in the storage unit, wherein the control unit causes the storage unit to store the lateral force information obtained by the lateral force obtaining unit, in association with the information of the traveling position history which is obtained by the traveling position history obtaining unit and the identification information obtained by the identification information obtaining unit, and wherein the output unit causes a display unit to output the lateral force information and the information of the traveling position history corresponding to each identification information, in association with each other.

In accordance with this configuration, it becomes possible to analyze the information corresponding to each of several riders or each of several vehicles.

The above and further objects, features and advantages of the present invention will more fully be apparent from the following detailed description of preferred embodiment with reference to the accompanying drawings.

DETAILED DESCRIPTION OF THE PREFERRED EMBODIMENTS

Hereinafter, the embodiment of the present invention will be described with reference to the drawings. Throughout the drawings, the same or corresponding constituents are designated by the same reference symbols, and will not be described in detail. The stated directions are from the perspective of a rider straddling a motorcycle.

Figure 1:
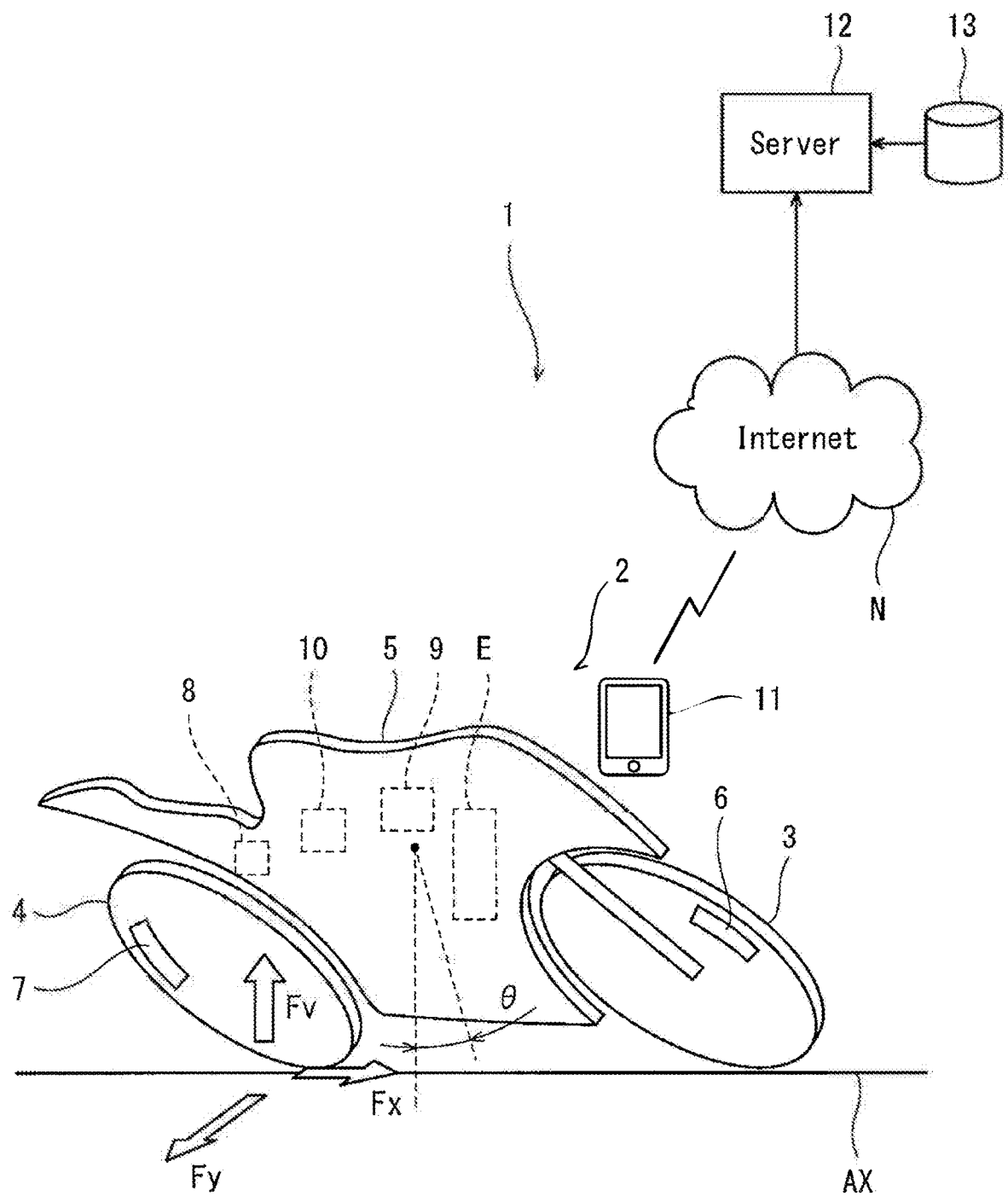
FIG. 1 is a view showing the overall configuration of a traveling information management system according to an embodiment.

FIG. 1 is a view showing the overall configuration of a traveling information management system 1 according to an embodiment. Referring to FIG. 1, traveling information to be stored and managed by the traveling information management system 1 is traveling information of a leanable vehicle which travels while tilting a vehicle body to the right or the left in a state in which a lateral force is applied from a road surface to a drive wheel. The leanable vehicle is defined as a vehicle which can travel with a tilt angle at which the whole of a moving object including a rider and the vehicle body keeps a balance with a centrifugal force, to thereby turn while keeping a tilted state of the vehicle body. The motorcycle 2 is a suitable example of the leanable vehicle. The motorcycle 2 includes a front wheel 3 which is a driven wheel and a rear wheel 4 which is a drive wheel. The motorcycle 2 turns while tilting (inclining) a vehicle body 5 (in a leaning state or a bank state) to the right or the left around a front-rear axis AX passing through a front wheel ground point and a rear wheel ground point. A tilt angle of the vehicle body 5 with respect to an upright state around the front-rear axis AX will be referred to as a bank angle $\theta$. The bank angle $\theta$ in a state in which the vehicle body 5 is in the upright state is zero.

The motorcycle 2 includes a driving power unit which generates driving power for allowing the motorcycle 2 to travel. In the present embodiment, as the driving power unit, an engine E (internal combustion engine) is used. Alternatively, an electric motor may be used instead of the engine E or both of the engine E and the electric motor may be used. The engine E is configured to apply the driving power to the rear wheel 4 via a driving power transmission mechanism.

The motorcycle 2 includes a hydraulic brake device which brakes the front wheel 3 and the rear wheel 4. The hydraulic brake device includes a front brake unit 6 which brakes the front wheel 3, a rear brake unit 7 which brakes the rear wheel 4, and a brake control unit 8 which controls the front brake unit 6 and the rear brake unit 7. The front brake unit 6 is independently operative to apply a braking force which is proportional to a brake pressure to the front wheel 3. The rear brake unit 7 is independently operative to apply a braking force which is proportional to a brake pressure to the rear wheel 4.

The motorcycle 2 includes a vehicle controller 9 (ECU). The vehicle controller 9 may be configured to control the driving power of the driving power unit such as the engine E, to perform a control (ABS control) of a braking operation of a wheel, or to control a vehicle body behavior (suspension motion or steering). The vehicle controller 9 receives detection information from sensors to control the motorcycle 2. The detection information of, for example, a throttle opening rate, a vehicle speed, an engine speed, a brake pressure or the like are input to the vehicle controller 9.

Forces applied from the road surface to the front wheel 3 or the rear wheel 4 include a longitudinal tire force $F_x$ applied to the tire of the front wheel 3 or the rear wheel 4 in a longitudinal direction (forward and rearward direction), a lateral tire force $F_y$ applied to the tire in a lateral direction (rightward and leftward direction), and a normal force $F_v$ applied to the tire in a vertically upward direction. Specifically, the longitudinal tire force $F_x$ is a force applied in the forward and rearward direction. During acceleration, the longitudinal tire force $F_x$ is applied to the drive wheel in a forward direction. During deceleration, the longitudinal tire force $F_x$ is applied to the drive wheel in a rearward direction, and applied to the driven wheel in the rearward direction. In Embodiment 1, the rear wheel 4 as the drive wheel is a target wheel to be controlled. Alternatively, the front wheel 3 may be the target wheel to be controlled. Each of the front wheel 3 and the rear wheel 4 may be the target wheel to be controlled. Further, a tire force including a combination of the tire force of the front wheel 3 and the tire force of the rear wheel 4 (e.g., averaged tire force of these forces) may be derived and stored. Main factors for applying the longitudinal tire force $F_x$ to the rear wheel 4 include, for example, the driving power transmitted from the engine E to the rear wheel 4 and the braking force applied from the rear brake unit 7 to the rear wheel 4. The lateral tire force $F_y$ is generated while the vehicle body 4 is turning. Main factors for applying the lateral tire force $F_y$ to the front wheel 3 and the rear wheel 4 include, for example, a reaction force of a centrifugal force based on a traveling speed and a turn radius.

The motorcycle 2 includes sensors which detect traveling states as will be described later. The motorcycle 2 includes a traveling information management device 10 which receives the detection signals from the sensors. The rider who steers the motorcycle 2 owns a portable information terminal 11 (e.g., smart phone). Or, the portable information terminal 11 is attached at a specified position of the motorcycle 2. The portable information terminal 11 is communicable with the traveling information management device 10 and with a server 12 and a data base 13 which are externally provided, via a network N (e.g., Internet).

Figure 2:
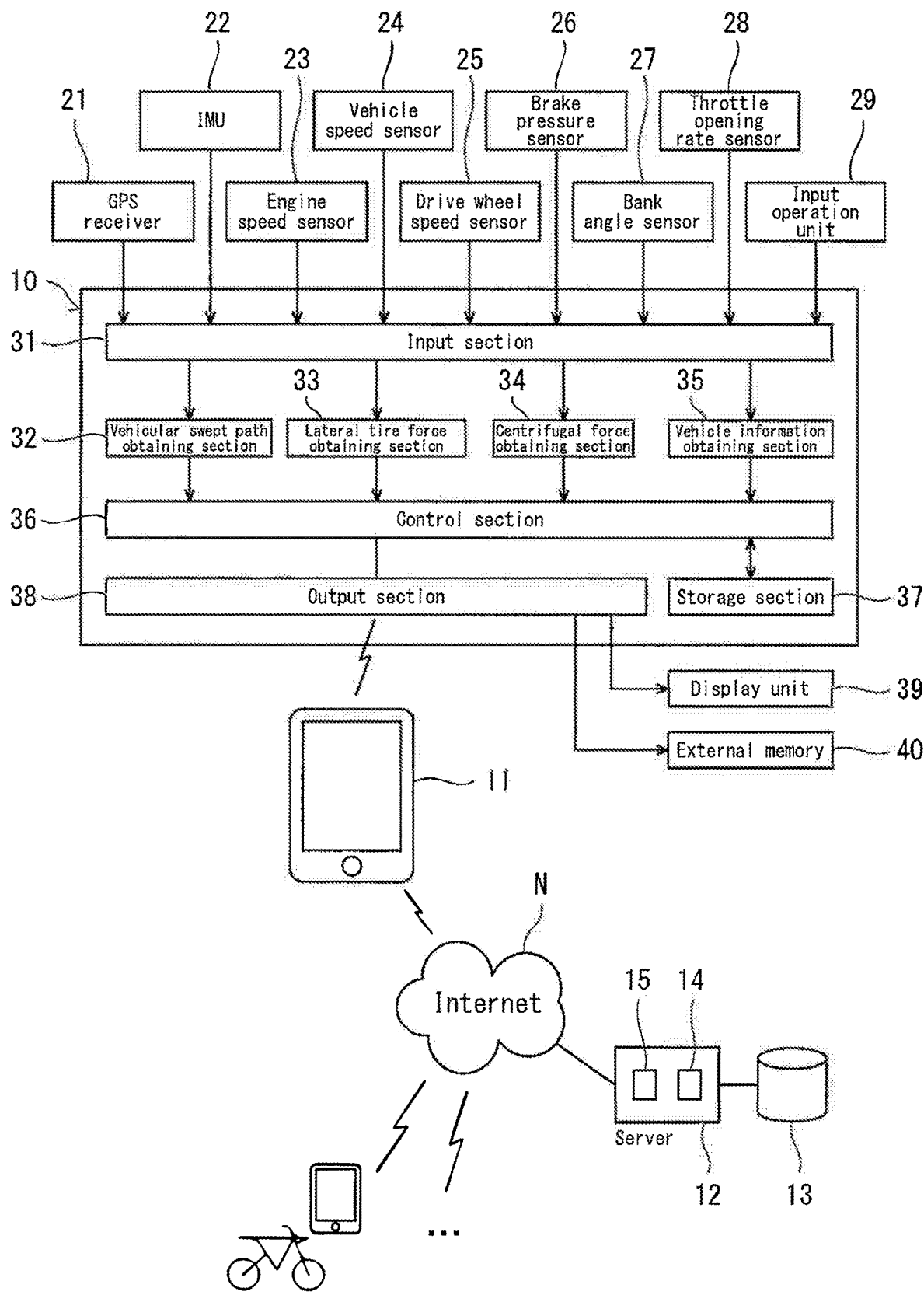
FIG. 2 is a block diagram of the traveling information management system of FIG. 1.

FIG. 2 is a block diagram of the traveling information management system 1 of FIG. 1. As shown in FIG. 2, a GPS receiver 21, an inertial measurement unit (IMU) 22, an engine speed sensor 23, a vehicle speed sensor 24, a driving wheel speed sensor 25, a brake pressure sensor 26, a bank angle sensor 27, a throttle opening rate sensor 28, and an input operation unit 29 are connected to the input side of the traveling information management device 10. The GPS receiver 21 receives vehicle position information from a GPS satellite. Instead of the GPS receiver 21, a position detection function of the portable information terminal 11 may be used. Instead of the GPS receiver 21, a travel distance and a travel direction may be cumulatively calculated based on detection signals of a speed sensor and a direction sensor to obtain present (current) position coordinates. In a case where a vehicular swept path (vehicle tracking) can be obtained, another existing detection device may be used. The IMU 22 is configured to detect a three-dimensional angular velocity and a three-dimensional acceleration rate by a three-axis gyro sensor and acceleration rate meter, and is capable of detecting acceleration rates in three-axis directions which are orthogonal to each other and angular velocities around the three axes. The engine speed sensor 23 is configured to detect a rotational speed of a crankshaft of the engine E.

The vehicle speed sensor 24 is configured to detect, for example, the rotational speed of the front wheel 3 which is the driven wheel, to detect the traveling speed of the motorcycle 2. The driving wheel speed sensor 25 is configured to detect the rotational speed of the rear wheel 4 which is the drive wheel. The brake pressure sensor 26 is configured to detect a brake pressure (e.g., hydraulic brake pressure) generated in the front brake unit 6 and a brake pressure (e.g., hydraulic brake pressure) generated in the rear brake unit 7. The bank angle sensor 27 is configured to detect an angle (bank angle) at which the vehicle body 5 is tilted from the upright state to the right or the left. The throttle opening rate sensor 28 is configured to detect the throttle opening rate of a throttle device which adjusts the amount of intake-air to be supplied to the engine E. The input operation unit 29 is, for example, a touch panel or a button which is operated (manipulated) by the rider to input a command.

The traveling information management device 10 includes as hardware, a processor, a volatile memory, a non-volatile memory, an I/O interface, or the like. The traveling information management device 10 includes as functions, an input section 31, a traveling position history obtaining section 32, a lateral tire force obtaining section 33 (lateral for detecting unit), a centrifugal force obtaining section 34 (lateral force detecting unit), a vehicle information obtaining section 35, a control section 36, a storage section 37, and an output section 38. The storage section 37 is implemented by the volatile memory and the non-volatile memory. The input section 37 and the output section 38 are implemented by the I/O interface. The traveling position history obtaining section 32, the lateral tire force obtaining section 33, the centrifugal force obtaining section 34, the vehicle information obtaining section 35, and the control section 36 are performed in such a way that the processor performs calculations (computations) by use of the volatile memory based on a traveling information processing program stored in the non-volatile memory.

The traveling position history obtaining section 32 is configured to derive the vehicular swept path as the traveling position history of the motorcycle 2 from the position information of the motorcycle 2 which is detected by the GPS receiver 21. The vehicular swept path is obtained by storing the position information of the motorcycle 2 every passage of specified time. As the traveling position history, the position coordinates to which the motorcycle 2 has traveled may be found. In that case, the position coordinates may be integrated in another step, as the vehicular swept path. The lateral tire force obtaining section 33 is configured to derive the lateral tire force $F_y$ (lateral force) applied to the rear wheel 4 as will be described later. The centrifugal force obtaining section 34 is configured to derive the centrifugal force applied to the vehicle body 5 while the motorcycle 2 is turning, based on the detection signal of the IMU 22 as will be described later. The vehicle information obtaining section 35 is configured to obtain the detection signals of the sensors 21 to 28. The control section 36 is configured to write data obtained from the traveling position history obtaining section 32, the lateral tire force obtaining section 33, the centrifugal force obtaining section 34, and the vehicle information obtaining section 35 in the storage section 37 and to read the data from the storage section 37.

The output section 38 is configured to output the data to a display unit 39 mounted in the motorcycle 2, and to an external memory 40. The output section 38 is configured to output the data to the portable information terminal 11 carried by the rider of the motorcycle 2 by short distance radio communication (e.g., Bluetooth (registered mark)). The portable information terminal 11 includes the traveling information processing program, and is configured to transmit and receive the data to and from the server 12 and the data base 13 which are remotely located, via a network N.

The server 12 further communicates with portable information terminals of motorcycles of other users, as in the case of the motorcycle 2. The traveling information of many users are stored in the data base 13. In brief, the server 12 functions as the traveling information storage device.

Figure 3:
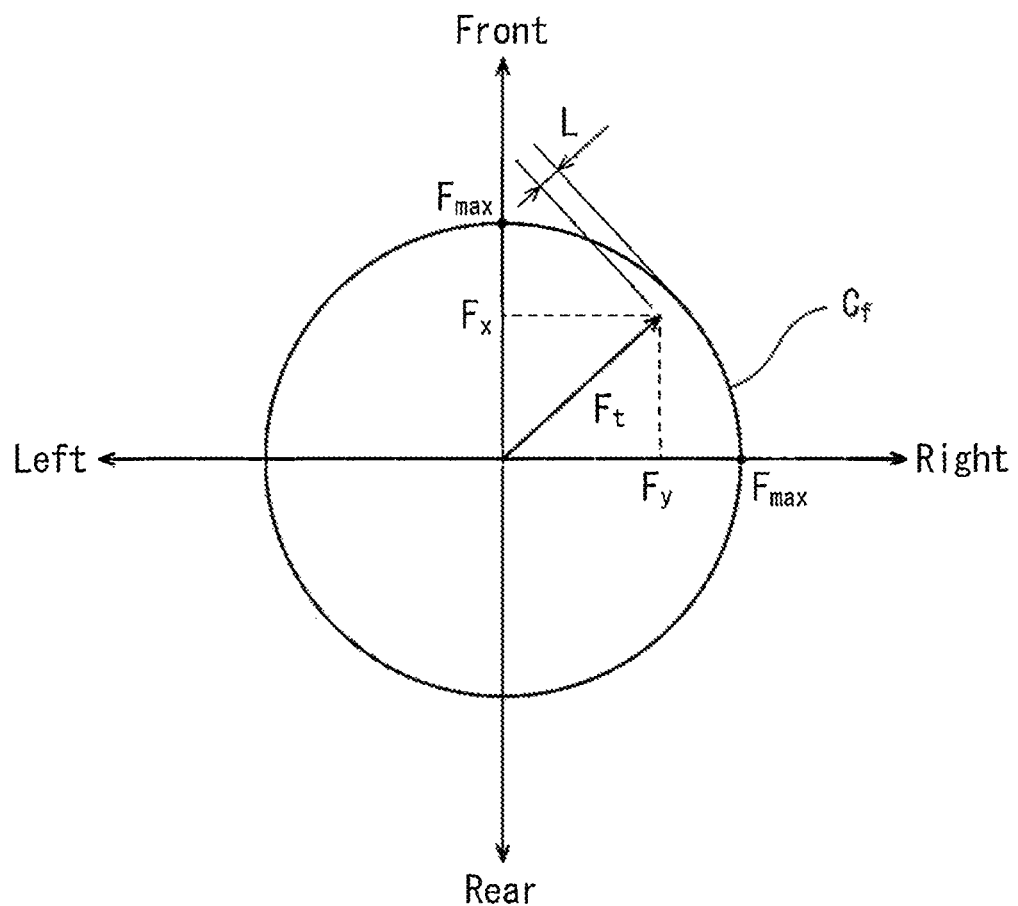
FIG. 3 is a plan view showing a friction circle of a rear wheel.

FIG. 3 is a plan view showing a friction circle of the rear wheel 4. As shown in FIG. 3, a friction circle $C_f$ of the rear wheel 4 is a circle indicating a gripping limit of the tire force of the rear wheel 4 with respect to the road surface. More specifically, the friction circle $C_f$ is a circle in which the rear wheel ground point on a horizontal plane perpendicular to a vertical direction is the center of the circle and the magnitude of a maximum frictional force (a product of a friction coefficient between the road surface and the rear wheel 4 and the normal force $F_v$ applied to the tire of the rear wheel 4) is the radius of the circle. The tire force generated between the rear wheel 4 and the road surface includes the longitudinal tire force $F_x$ which is a traveling direction component of the rear wheel 4 and the lateral tire force $F_y$ which is a lateral direction component that is orthogonal to the traveling direction.

A point of origin of a total force $F_t$ of the longitudinal tire force $F_x$ and the lateral tire force $F_y$ is located on the center of the friction circle $C_f$. While the end point of the total force $F_t$ is within the friction circle $C_f$, the total force $F_t$ and the frictional force are balanced, and the slip of the rear wheel 4 is prevented. When the total force $F_t$ exceeds the friction circle $C_f$, the total force $F_t$ is greater than the maximum frictional force. Therefore, the rear wheel 4 slips against the maximum frictional force. A distance L between the end point of the total force $F_t$ and the friction circle $C_f$ in a case where the end point of the total force $F_t$ is within the friction circle $C_f$, is an allowance degree FS within which the slip of the rear wheel 4 on the road surface does not occur. The allowance degree FS may be set to a predetermined value based on, for example, a test result.

The centrifugal force obtaining section 34 is configured to derive a centrifugal force $F_c$ (lateral force) based on the detection signal of the IMU 22 and the detection signal of the bank angle sensor 27. Specifically, in a case where the vehicle body 5 is in the bank state, the detection direction of the IMU 22 is inclined together with the vehicle body 5 with respect to a horizontal plane. Therefore, the centrifugal force $F_c$ is calculated according to the following formula (3). A lateral acceleration rate α assigned to the following formula (1) is calculated according to the following formula (2). A indicates the lateral acceleration rate detected by the IMU 22, and θ indicates the bank angle. A indicates the lateral acceleration rate in coordinates in which the IMU is the reference, and is the lateral acceleration rate which is inclined with respect to the horizontal direction by the bank angle θ in coordinates in which the road surface is the reference. Alternatively, the centrifugal force may be calculated based on a curvature of the vehicular swept path (curve track) and the vehicle speed data. Further, the centrifugal force may be calculated based on an acceleration rate in a yawing direction and an acceleration rate in a roll direction which are detected by the IMU 22.

The lateral tire force obtaining section 33 is configured to derive the lateral tire force $F_y$ according to the following formula (1). α indicates the horizontal lateral acceleration rate which is applied to the vehicle body 5 in the rightward and leftward direction. γ indicates a yaw rate detected by the IMU22. $f_1$ indicates a function in which the lateral tire force $F_y$ increases, as the lateral acceleration rate α increases, and as the yaw rate γ increases.

$$F_y = f_1(\alpha, \gamma) \qquad \text{Formula (1)}$$

In a case where the vehicle body 5 is in the bank state, the detection direction of the IMU 22 is inclined together with the vehicle body 5 with respect to the horizontal plane. Therefore, the lateral acceleration rate α assigned to the following formula (1) is calculated according to the following formula (2). A indicates the lateral acceleration rate detected by the IMU 22. θ indicates the bank angle.

$$\alpha = A \cdot \arccos\theta \qquad \text{Formula (2)}$$

Although the lateral tire force obtaining section 33 is configured to calculate and obtain the lateral tire force based on the information received from the sensor which detects the information other than the lateral tire force, the lateral tire force obtaining section 33 may obtain the information of the lateral tire force detected by the sensor. For example, the tire force may be detected by use of a strain gauge for detecting the force, as disclosed in Japanese Laid-Open Patent Application Publication No. 2017-161395.

The centrifugal force obtaining section 34 derives the centrifugal force $F_c$ from the detection signal of the IMU 22 and the detection signal of the bank angle sensor 27. Specifically, in a case where the vehicle body 5 is in the bank state, the detection direction of the IMU 22 is inclined together with the vehicle body 5 with respect to the horizontal plane. Therefore, the centrifugal force $F_c$ is calculated according to the following formula (3). In the formula (3), m indicates the mass of the vehicle body 5.

$$F_c = m \cdot \alpha \qquad \text{Formula (3)}$$

The calculation method of the centrifugal force $F_c$ is exemplary, and another calculation method may be used. For example, as disclosed in Japanese Laid-Open Patent Application Publication No. 2017-65561, a force which keeps a balance with a tilt angle (moving object bank angle) in the vehicle width direction, of the whole of the moving object including the vehicle and the rider may be derived as the centrifugal force. Specifically, the moving object bank angle is different from the vehicle body bank angle and is a value corresponding to the lateral force (centrifugal force). In a case where an acceleration rate sensor is mounted in the portable information terminal 11, the centrifugal force $F_c$ may be derived by use of the acceleration rate sensor of the portable information terminal 11.

It is sufficient that the lateral force is the information corresponding to a force in the lateral direction. In the present embodiment, the lateral force may include the lateral tire force $F_y$ and the centrifugal force $F_c$. The control section 36 of the traveling information management device 10 is configured to cause the storage section 37 to store the lateral tire force $F_y$ derived by the lateral tire force obtaining section 33 and/or the centrifugal force $F_c$ derived by the centrifugal force obtaining section 34 so that the lateral tire force $F_y$ and the centrifugal force $F_c$ are associated with the information of the vehicular swept path obtained by the traveling position history obtaining section 32. In addition, the control section 36 is configured to cause the storage section 37 to store the allowance degree L in association with the information of the vehicular swept path in addition to the lateral tire force $F_y$ and/or the centrifugal force $F_c$. Further, the control section 36 is configured to calculate average value(s) and peak value(s) in every specified (constant) period, of the lateral tire force $F_y$ and/or the centrifugal force $F_c$. The control section 36 is configured to cause the storage section 37 to store the calculated average value(s) and peak value(s), together with the lateral tire force $F_y$ and/or the centrifugal force $F_c$. The specified (constant) period may be a specified time or a specified distance. The period may be set to correspond to each curve, or one period may be set to correspond to a plurality of curves.

The control section 36 is configured to cause the storage section 37 to store the lateral tire force $F_y$ and/or the centrifugal force $F_c$ in association with detection information (e.g., information obtained by the sensors 21 to 28) obtained by the vehicle information obtaining section 35. The control section 36 is configured to cause the storage section 37 to store the traveling information in such a way that the traveling information is classified by the road surface state (e.g., degree of wetness or degree of roughness) and/or surrounding environments (e.g., temperature, humidity or weather), which are input by the input operation unit 29 or the like. The road surface state and/or the surrounding environments may be manually input by a user. The control section 36 is configured to cause the output section 38 to output the information stored in the storage section 37, and to send the information to the server 12 via the portable information terminal 11 and the network N. This information is stored in the data base 13.

The road surface information may be a friction coefficient estimated from a speed difference between the front wheel 3 and the rear wheel 4, or a road surface state externally obtained by use of an external communication means. As the road surface state, unevenness of the road surface, up/down slope, right/left slope, or the like may be obtained from a stroke sensor and an acceleration rate sensor of the motorcycle 2. Or, as the road surface state, a high-speed road, a general road, a town road, an uneven road, or the like, may be obtained by use of a GPS, ETC, or the like. The surrounding environment information may be obtained from information based on the detection signal of a temperature sensor and the detection signal of an atmospheric pressure sensor, or obtained based on the position of the motorcycle 2 and present time by the portable information terminal 11 via Internet.

The data sent from the traveling information management device 10 to the server 12 via the portable information terminal 11 is attached with identification information of the motorcycle 2 and identification information of the rider. The identification information of the motorcycle 2 is pre-stored in the traveling information management device 10. The identification information of the rider may be registered in the portable information terminal 11 or may be input by use of a handle switch or the like. The server 12 includes an identification information obtaining section 14 which obtains the identification information of the motorcycle 2 and the identification information of the rider. The traveling information processing program installed in the server 12 performs traveling analysis, and causes the output section 15 to output to the portable information terminal 11 (display unit), the traveling information, including the lateral tire force $F_y$ and the centrifugal force $F_c$, analysis results, or the like, corresponding to each identification information so that the traveling information, analysis results, or the like are associated with the vehicular swept path.

Figure 4A:
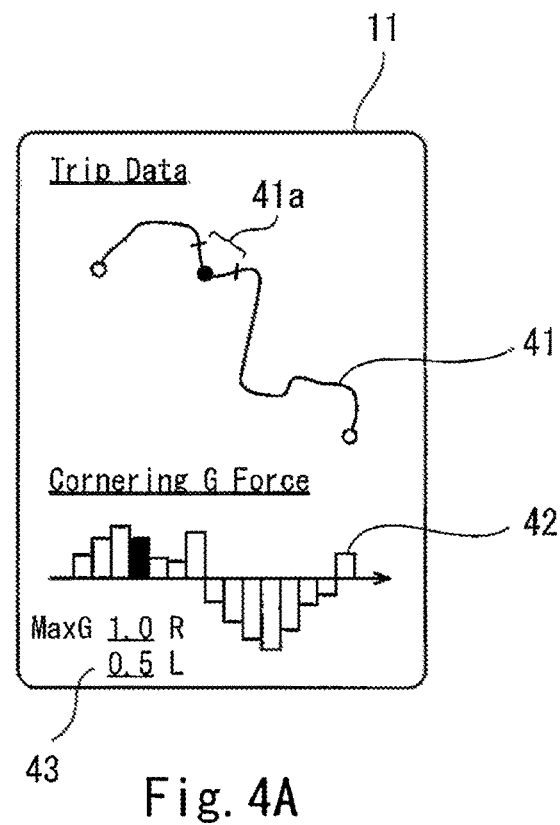
FIGS. 4A and 4B are views showing examples of a display screen of a portable information terminal of FIG. 2.

For example, as shown in FIG. 4A, vehicular swept path 41 is displayed on the screen of the portable information terminal 11. A selected location 41a of the vehicular swept path 41 is displayed to be distinguishable from another location (portion). A time series lateral force graph 42 of the lateral force (the lateral tire force $F_y$ and/or the centrifugal force $F_c$) during a turn at the selected location 41a is displayed adjacently to the vehicular swept path 41. As the selected location 41a, a desired location on the vehicular swept path 41 can be selected. In the time series lateral force graph 42, the lateral force corresponding to a right bank and the lateral force corresponding to a left bank are displayed such that the lateral forces are expressed as positive and negative values to be distinguishable from each other. A maximum value of the centrifugal force which is directed rightward and a maximum value of the centrifugal force which is directed leftward, at the selected location 41a, are displayed adjacently to the time series lateral force graph 42.

Figure 4B:
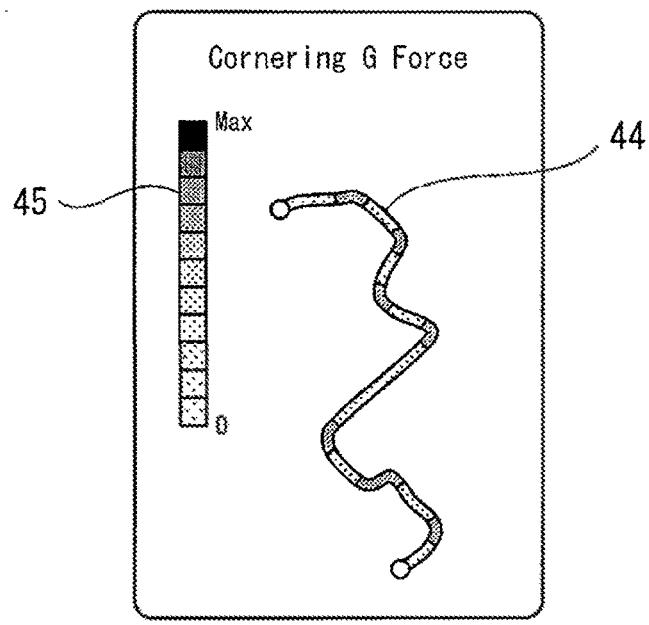

In another example, as shown in FIG. 4B, a vehicular swept path (vehicle tracking) 44 is displayed on the screen of the portable information terminal 11. The color of the vehicular swept path 44 is variable. By the color of each location of the vehicular swept path 44, the magnitude of the lateral force (the lateral tire force $F_y$ and/or the centrifugal force $F_c$) is displayed. A definition of a correlation between the magnitude and the color of the lateral force is displayed as a legend 45, next to the vehicular swept path 44. Preferably, the allowance degree FS within which the slip of the rear wheel 4 on the road surface does not occur is displayed on the screen of the portable information terminal 11 such that the allowance degree F can be identified by numeric value, color, or the like, in association with the vehicular swept path 44.

The rider makes a contact with the information stored in the storage section 37, to know the information indicating the lateral force generated in the motorcycle 2 while the motorcycle 2 is turning (during a turn) and the vehicular swept path in which that lateral force is generated, in association with each other. For example, the rider can adjust the lateral force by changing the vehicular swept path or the traveling speed in future traveling, in view of the lateral force generated in the past. For example, in a case where the rider finds that the lateral force is larger with respect to a maximum friction force that can be generated between the wheel and the road surface, the turn radius can be increased or the traveling speed can be reduced so that the lateral tire force can be reduced to reduce a possibility of occurrence of a lateral slip. In this way, indicators which can be utilized to adjust the traveling operation performed by the rider at next time can be provided.

In some cases, the motorcycle 2 makes a turn in a state in which the center of mass (weighted center) of the rider is deviated from the center of mass (weighted center) of the vehicle body to the right or the left. Specifically, there are lean-in traveling in which the center of mass of the rider is shifted toward the inner side (curvature center of a curved vehicular swept path during a turn) of a corner, relative to the center of the vehicle body, and lean-out traveling in which the center of mass of the rider is shifted toward the outer side of the corner which is opposite to the inner side of the corner, relative to the center of the vehicle body. In this case, there is a difference between the center of mass (weighted center) of the moving object including the motorcycle 2 and the rider, and the center of mass (weighted center) of only the motorcycle 2. Therefore, a balance with the centrifugal force cannot be accurately detected if only the bank angle of the motorcycle 2 is referred to. In the present embodiment, the lateral force generated in the motorcycle 2 is stored as the information, instead of the bank angle of the motorcycle 2. This makes it possible to provide the indicator which can be utilized to adjust the traveling operation performed at next time, irrespective of the traveling style of the rider. It is sufficient that a value corresponding to the centrifugal force as the lateral force may be a value which is changeable in correspondence with the lateral force. For example, the value corresponding to the centrifugal force may be a tilt angle (moving object bank angle) of a virtual line with respect to a vertical line, the virtual line connecting the center of mass (weighted center) of the whole of the moving object including the vehicle and the rider to a vehicle ground point.

For example, in a case where the vehicle body 5 is banked positively, at the beginning of a turn, an inner wheel difference between the front wheel 3 may occur and a force for steering the front wheel 3 may be generated. In this case, to prevent the vehicle body 5 from falling down, the lean-out traveling is performed by the rider. In a case where a lateral force exceeding a maximum bank angle which is a limit value at which the vehicle body 5 contacts the road surface is generated, the lean-in traveling is performed by the rider, to prevent the vehicle body 5 from falling down. As should be understood from this, the lateral force and the vehicle body bank angle do not conform to each other. In a case where the vehicle body bank angle is decided by a factor other than the centrifugal force, such as steering/vehicle body shape, gripping of the tire, the traveling style, or preference, as described above, the lateral force is used as the indicator in the present embodiment. This makes it easy to analyze traveling and use the indicator to adjust the traveling operation performed at next time.

The force working outward in the turn direction is used as the lateral force. For example, even in a case where yawing or the like occurs in the motorcycle 2 while the motorcycle 2 is turning, the information of the lateral force which affects more the turn can be obtained. Specifically, along with the revolution around the center of the curvature of the curved vehicular swept path during the turn, at least one of the front and rear wheels 3, 4 slides, or the motorcycle 2 turns around a reference point set in the vehicle body 5. In this case, by utilizing the centrifugal force except the influence of the slide or the turn around the reference point set in the vehicle body 5, as the lateral force, the traveling can be analyzed more accurately. For example, while the motorcycle 2 is turning, the rider may tilt the vehicle body 5 around the front-rear axis over time. This transit change is called rolling. In this case, by utilizing the centrifugal force except the influence of the rolling as the lateral force, the traveling can be analyzed more accurately. Further, the rider can understand the timing or position of the operation for tilting the vehicle body 5 or changing the vehicle body 5 from the tilted state to the upright state, from a change over time of the lateral force generated for the turn (timing when the lateral force begins or ends). The timing or position of this operation can be used to adjust the traveling operation performed by the rider at next time.

As a lateral force state such as a magnitude or a change over time, in a case where the rider drives the motorcycle 2, there is a comfortable traveling range for the rider. The comfortable traveling range is set based on the rider's traveling level. In a case where the lateral force is less than the comfortable traveling range, it can be estimated that the traveling path is a monotonous traveling path. On the other hand, in a case where the lateral force is greater than the comfortable traveling range, it can be estimated that the traveling path is a challenging traveling path (the level of difficulty of the traveling path is high). In the case of the traveling path in which the lateral force is within the comfortable traveling range, it can be estimated that the corresponding rider is more likely to travel comfortably on this traveling path.

Since the information in which the lateral force and the vehicular swept path are associated with each other is displayed, the rider can know the lateral force generated in each traveling path. This allows the rider to estimate the level of difficulty of the traveling path. For example, it is predicted that a lateral slip is more likely to occur as the lateral force is greater. From this, the rider can estimate that the traveling path is more challenging (the level of difficulty of the traveling path is higher) as the lateral force generated in that traveling path is greater. Since the information in which the lateral force and the vehicular swept path are associated with each other is displayed, the traveling style of the rider can be estimated. In the case of the motorcycle to which a greater lateral force is applied, of the motorcycles traveling on the same traveling path, the corresponding rider prefers an active traveling style in which the traveling speed is high during the turn. In contrast, in a case where the amount of a change over time of the lateral force applied to the motorcycle 2, is less, the corresponding rider prefers a smooth traveling style. Since the indicator is such that the lateral force and the vehicular swept path are associated with each other, it becomes possible to obtain the indicator which is close to the rider's actual sense, compared to the vehicle body bank angle. This makes it possible to obtain the information which is close to the rider's actual sense and helpful in analyzing the traveling skill or the traveling path.

In a case where the lateral force applied in the radially outward direction of the turn, which is stored in the storage section 37, is the lateral tire force, and the lateral tire force is stored as the indicator, an actual force generated between the road surface and the tire can be known, even in a case where yawing, pitching or the like occurs. This makes it easy to compare an actual tire force to a maximum friction force applied between the wheel and the road surface and analyze whether or not the lateral sip is likely to occur in the wheel. Since the longitudinal tire force is also stored as the indicator in the storage section 37, it becomes easier to analyze whether or not a slip in a combination of a longitudinal direction and a lateral direction is likely to occur in the tire. Since the rider can know the information of the tire force as the lateral force, the rider can estimate degree of easiness of a slip on the vehicular swept path, and to obtain useful information. As a result, the rider can easily adjust the traveling operation, including adjustment of the vehicular swept path, the vehicle speed, the bank angle operation, and acceleration/acceleration operation.

Since the lateral tire force of the front wheel 3 and the lateral tire force of the rear wheel 4 are stored in the storage section 37, the rider can know the lateral tire force applied to the front wheel and the lateral tire force applied to the rear wheel 4. For example, in a case where the lateral slip occurs, the rider can estimate which of the lateral tire force of the front wheel and the lateral tire force of the rear wheel affected this lateral slip. This allows the rider to easily adjust the traveling operation performed at next time. For example, in addition to the above-described adjustment of the traveling operation, the weight of the rider may be shifted toward the wheel in which the lateral slip is likely to occur, to increase a normal force, or posture balance of the vehicle body in a pitching direction may be adjusted.

The information corresponding to each identification information of the vehicle is gathered in the server 12. This makes it possible to obtain the lateral force and the vehicular swept path corresponding to the kind of the vehicle, and to analyze the traveling corresponding to the vehicle owned by the rider. For example, it becomes to provide an average lateral force applied to the tire of the wheel, or the operation performed by a skillful person (how the lateral force is applied to the tire). By utilizing this information, the rider can improve the rider's skill of the traveling operation. As the identification information of the vehicle, there is a vehicle kind, setting, or the kind of the tire. By these identification information, it becomes possible to analyze the rider's traveling style, or proper settings corresponding to the vehicle kind.

The information corresponding to each identification information of the rider is gathered in the server 12. A rider group with the driving skills and traveling style, which are close to those of the target rider, is extracted. An average lateral force in this group, the traveling operation performed by a skillful rider (how the lateral force is applied to the tire), or the like can be provided. The lateral force application corresponding to the driving performed by the rider may be compared to the lateral force application corresponding to the driving performed by the skillful person. Instead of comparison for the purpose of improving the rider's skills, comparison between familiar riders may be made. As the identification information of the rider, sex, traveling history, age, address, favorite traveling style, favorite traveling path, and the like may be set. The lateral force, the vehicular swept path, and the information which can be classified, are stored in the server 12, in association with each other. The trend can be analyzed and compared and helpful information can be obtained from the information of several vehicles and riders.

The present invention is not limited to the above-described embodiment, and the configuration may be changed added, or deleted. Only the server 12 may calculate and store the traveling information without using the traveling information management device 10. For example, the server 12 may have the function of the control section 36 of the traveling information management device 10. Only the traveling information management device 10 may calculate and store the traveling information without using the server 12. For example, the traveling information management device 10 may have the function of the data base 13. The traveling information processing program stored in the traveling information management device 10 may be stored in the portable information terminal 11. In this case, the traveling position history obtaining section 32, the lateral tire force obtaining section 33, the centrifugal force obtaining section 34, the vehicle information obtaining section 35, the control section 36, the storage section 37, the output section 38 and the display unit 39 may be included in the portable information terminal 11. The traveling information management device 10 may send the lateral force information and the vehicular swept path to the portable information terminal 11. The portable information terminal 11 may store the lateral force information in association with the vehicular swept path. The function of the traveling information management device 10 and the function of the portable information terminal 11 may be performed by a stationary personal computer.

The control section 36 may output the data (related information of the vehicular swept path and the lateral force) to the portable information terminal 11 and the portable information terminal 11 may store the data, without storing the data in the non-volatile area of the storage section 37. The data obtained by the control section 36 may be stored in the server 12 on Internet, without storing the data in the portable information terminal 11. In this case, the control section 36 need not continue to store the data. It is sufficient that a temporal storage area is provided in the control section 36. The storage area can be reduced. After the data of a certain volume has been stored in the control section 36, the control section 36 may send the data. During stopped state of the motorcycle 2, the control section 36 may send the data. In a case where the control section 36 is used as a vehicle body controller, a vehicle body control is performed preferentially during traveling. Reduction of processing speed can be suppressed. A temporal storage area may also be provided in the portable information terminal 11. The portable information terminal 11 may defer sending the data until a connection state via a public communication line is established. The data can be sent to the server 12 with high reliability.

The method of deriving the centrifugal force $F_c$ is not limited to the above-described formula (3). For example, the turn radius may be derived based on the angle and angular acceleration rate in the yawing direction of the vehicle body 5, which are detected by the IMU 22, and the centrifugal force $F_c$ may be derived based on the turn radius and the vehicle speed. In that case, to exclude the effects caused by the bank of the vehicle body 5, from the angular acceleration rate in the yawing direction, the effects caused by the angular acceleration rate in the rolling direction may be subtracted from the angular acceleration rate in the yawing direction.

The method of deriving the lateral tire force $F_y$ is not limited to the above-described formula (1). For example, a differential value of the rotational speed of the rear wheel 4 (or differential value of the engine speed) correlates with the longitudinal tire force $F_x$ applied to the tire of the rear wheel 4. In the formula (4), T indicates torque, M indicates inertia moment, and ω indicates the engine speed.

$$T = M \cdot \frac{dw^2}{dt^2} \qquad \text{Formula (4)}$$

The longitudinal tire force $F_x$ may be derived based on the rear wheel speed detected by the drive wheel speed sensor 25 (or the engine speed detected by the engine speed sensor 23), and the allowance degree FS within which the slip of the rear wheel 4 on the road surface does not occur, is derived according to the following formula (5). In the formula (5), $F_L$ is derived according to the following formula (6). $T_{max}$ indicates maximum torque (friction circle) which can be output without occurrence of a slip. ΔV indicates a temporal differential value of the rear wheel speed or the engine speed.

$$FS = \sqrt{1 - F_L^2} \qquad \text{Formula (5)}$$

$$F_L = \frac{\Delta V_R}{T_{max}} \qquad \text{Formula (6)}$$

What is claimed is:

1. A method of storing traveling information of a leanable vehicle which turns in a leaning state, the method comprising the steps of:
   obtaining information of a traveling position history of the leanable vehicle;
   detecting lateral force information including a lateral force applied to the leanable vehicle in a radially outward direction of a turn or a value corresponding to the lateral force, while the leanable vehicle is turning; and
   storing the detected lateral force information in association with the obtained information of the traveling position history.

2. The method of storing the traveling information of the leanable vehicle according to claim 1,
   wherein the lateral force is a centrifugal force.

3. The method of storing the traveling information of the leanable vehicle according to claim 1,
   wherein the lateral force includes information of a component of a tire force generated in at least one wheel of the leanable vehicle.

4. The method of storing the traveling information of the leanable vehicle according to claim 3,
   wherein the tire force generated in the at least one wheel includes a tire force generated in a front wheel of the leanable vehicle and a tire force generated in a rear wheel of the leanable vehicle.

5. The method of storing the traveling information of the leanable vehicle according to claim 3, further comprising the steps of:
   calculating an allowance degree within which a slip of a wheel of the leanable vehicle on a road surface does not occur; and
   storing the allowance degree in association with the information of the traveling position history, together with the lateral force information, in the step of storing the detected lateral force information.

6. The method of storing the traveling information of the leanable vehicle according to claim 1, further comprising the steps of:
   calculating at least one of an average value and a peak value in each period, of the lateral force information; and
   storing the at least one of the average value and the peak value, together with the lateral force information, in the step of storing the detected lateral force information.

7. The method of storing the traveling information of the leanable vehicle according to claim 1, wherein in the step of storing the detected lateral force information, the lateral force information is stored in association with detected information input to a vehicle controller.

8. The method of storing the traveling information of the leanable vehicle according to claim 1, wherein in the step of storing the detected lateral force information, the lateral force information is classified based on a road surface state or a surrounding environment.

9. The method of storing the traveling information of the leanable vehicle according to claim 1, wherein in the step of storing the detected lateral force information, the lateral force information is stored in association with identification information of the leanable vehicle or a rider.

10. A method of storing traveling information of a leanable vehicle which turns in a leaning state, the method comprising the steps of:
    obtaining information of a traveling position history of the leanable vehicle;
    calculating an allowance degree within which a slip of a wheel of the leanable vehicle on a road surface does not occur; and
    storing the allowance degree in association with the information of the traveling position history.

11. A device for storing traveling information of a leanable vehicle which turns in a leaning state, the device comprising:
    an identification information obtaining unit which obtains identification information of the leanable vehicle or a rider;
    a traveling position history obtaining unit which obtains information of a traveling position history of the leanable vehicle;
    a lateral force obtaining unit which obtains lateral force information including a lateral force applied to the leanable vehicle in a radially outward direction of a turn or a value corresponding to the lateral force, while the leanable vehicle is turning;

a control unit connected to the traveling position history obtaining unit and to the lateral force obtaining unit;

a storage unit which stores data processed by the control unit; and an output unit which causes a display unit to output the data stored in the storage unit, wherein the control unit causes the storage unit to store the lateral force information obtained by the lateral force obtaining unit, in association with the information of the traveling position history which is obtained by the traveling position history obtaining unit and the identification information obtained by the identification information obtaining unit, and wherein the output unit causes a display unit to output the lateral force information and the information of the traveling position history corresponding to each identification information, in association with each other.

* * * * *